(12) United States Patent
Brewton

(10) Patent No.: US 9,038,574 B1
(45) Date of Patent: May 26, 2015

(54) PETS AND OTHER MAMMALIAN QUADRUPED WALKING SYSTEM

(71) Applicant: Isabelle Brewton, Smyrna, GA (US)

(72) Inventor: Isabelle Brewton, Smyrna, GA (US)

( * ) Notice: Subject to any disclaimer, the term of this patent is extended or adjusted under 35 U.S.C. 154(b) by 181 days.

(21) Appl. No.: 13/938,734

(22) Filed: Jul. 10, 2013

(51) Int. Cl.
*A01K 27/00* (2006.01)

(52) U.S. Cl.
CPC .................. *A01K 27/002* (2013.01)

(58) Field of Classification Search
CPC ............... A01K 27/002; A01K 27/006
USPC ................................. 119/792, 858
See application file for complete search history.

(56) References Cited

U.S. PATENT DOCUMENTS

| | | |
|---|---|---|
| 3,871,336 A | 3/1975 | Bergman |
| 3,999,521 A | 12/1976 | Puiello |
| 5,370,082 A | 12/1994 | Wade |
| D363,572 S | 10/1995 | Obenchain |
| 5,535,106 A | 7/1996 | Tangen |
| 5,970,921 A | 10/1999 | Fulton |
| 6,070,556 A | 6/2000 | Edwards |
| D455,873 S | 4/2002 | Constans |
| 7,997,235 B2 | 8/2011 | Hurwitz |
| 2010/0212601 A1 | 8/2010 | Hurwitz |

OTHER PUBLICATIONS www.petsmart.com, Lil' Paw Reflective Nylon Harness, Website, accessed Feb. 20, 2013.

*Primary Examiner* — Monica Williams

(57) ABSTRACT

A mammalian quadruped walking system for providing visibility in dimly lit conditions features a body harness having a first side top shoulder strap, a second side top shoulder strap, a bottom strap, an upper body strap, a lower body strap, and a breast shield. The breast shield features a powerful bicycle's strength planar reflector that is only red or blue. The system features a harness extension having an extension first end located at an intersection of a first side top shoulder strap second end, a second side top shoulder strap second end and an upper body strap midpoint. A powerful bicycle's strength spherical red bead reflector is located adjacent to a spherical blue bead reflector close to a harness extension second end. The system features an external light source emitting light in a horizontal beam between 22 inches and 54 inches from a ground surface.

10 Claims, 4 Drawing Sheets

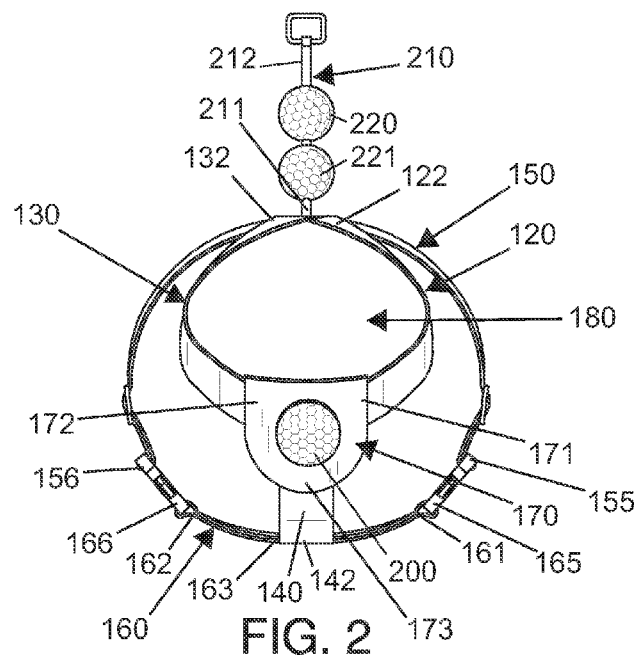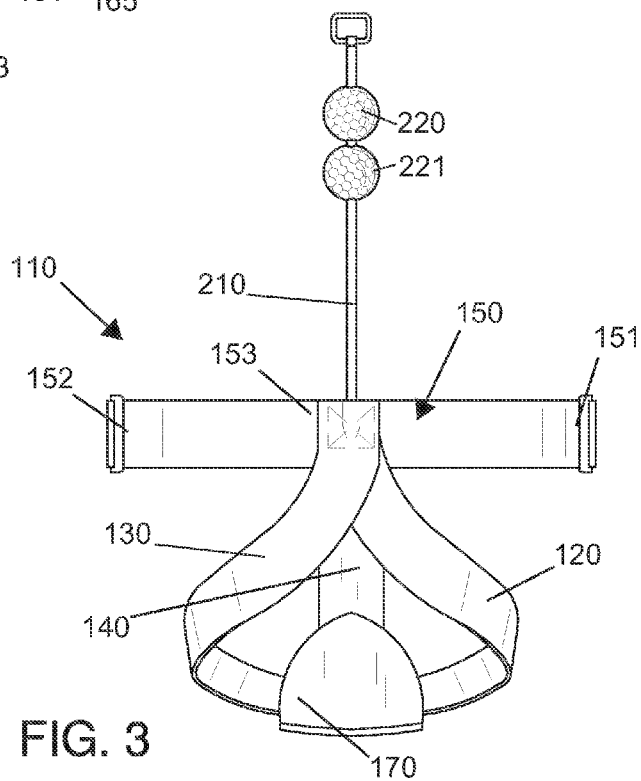

PETS AND OTHER MAMMALIAN QUADRUPED WALKING SYSTEM

FIELD OF THE INVENTION

The present invention relates to reflector systems for pets.

BACKGROUND OF THE INVENTION

When walking a dog or other pet in dimly lit conditions, it can be difficult to remain visible to oncoming traffic for both the pet and the walker. Devices have been introduced to make the pet more visible, but such devices as reflective collars and vests, typically feature reflective components (such as tape or cloth) that are inferior in reflective properties to a typical reflector as found on a bicycle. The present invention features a mammalian quadruped walking system providing enhanced visibility in dimly lit conditions featuring spherical reflectors in a designated color scheme on a harness extension coupled with a large reflector on the chest of the pet.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a mammalian quadruped walking system providing visibility in dimly lit conditions. In some embodiments, the system comprises a body harness having a first side top shoulder strap, a second side top shoulder strap, a bottom strap, an upper body strap, a lower body strap, and a breast shield. In some embodiments, the breast shield comprises a planar reflector located thereon. In some embodiments, wherein the planar reflector is only red or blue.

In some embodiments, the system comprises a harness extension having an extension first end located at the intersection of the first side top shoulder strap second end, the second side top shoulder strap second end, and the upper body strap midpoint. In some embodiments, a spherical red bead reflector is located adjacent to a spherical blue bead reflector close to a bead extension second end.

In some embodiments, the system comprises an external light source emitting light in a horizontal beam. In some embodiments, the external light source is located between 22 inches and 54 inches from a ground surface.

BRIEF DESCRIPTION OF THE DRAWINGS

FIG. 2 shows a front view of the body harness of the present invention.

FIG. 3 shows a top view of the body harness of the present invention.

DESCRIPTION OF PREFERRED EMBODIMENTS

Figure 1:
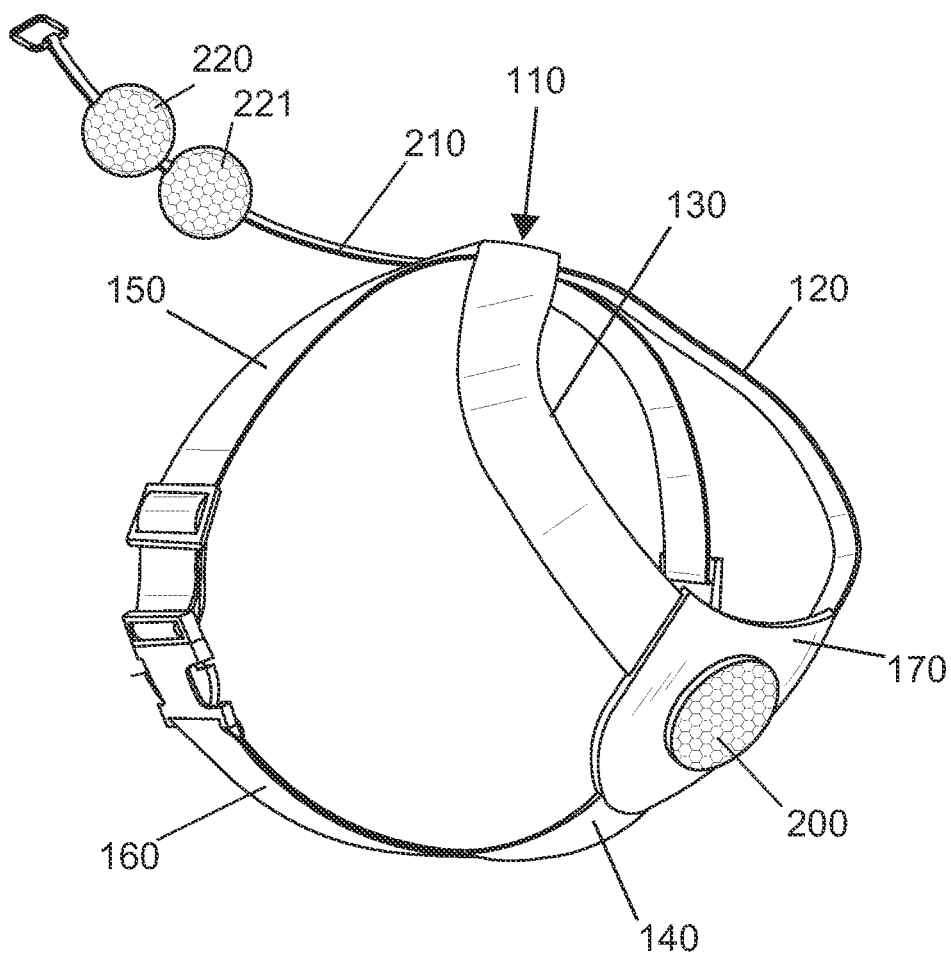
FIG. 1 shows a perspective view of the body harness of the present invention.
Figure 4:
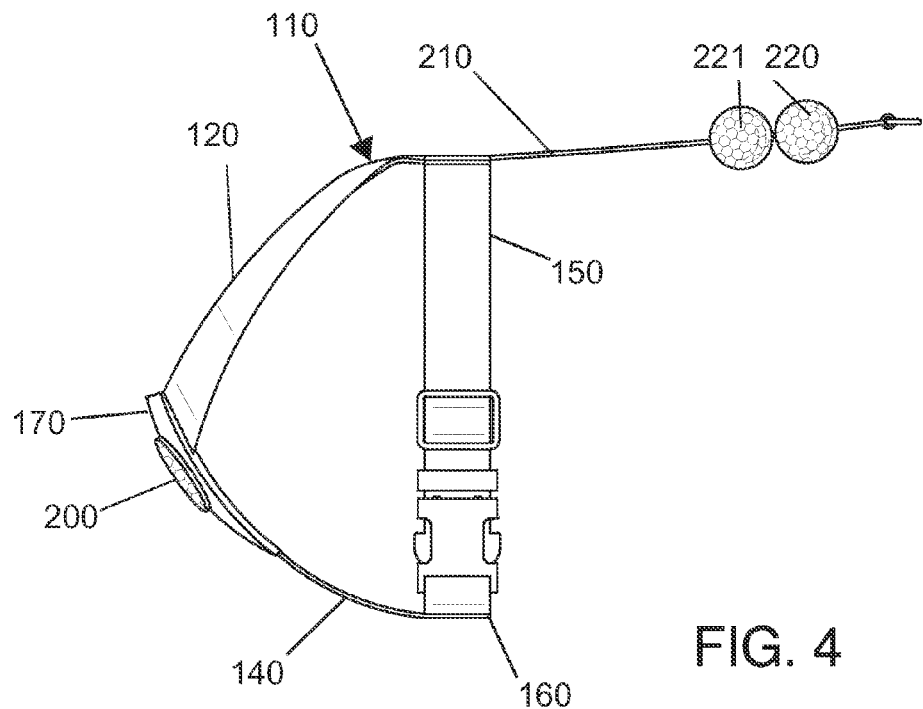
FIG. 4 shows a side view of the body harness of the present invention.
Figure 5:
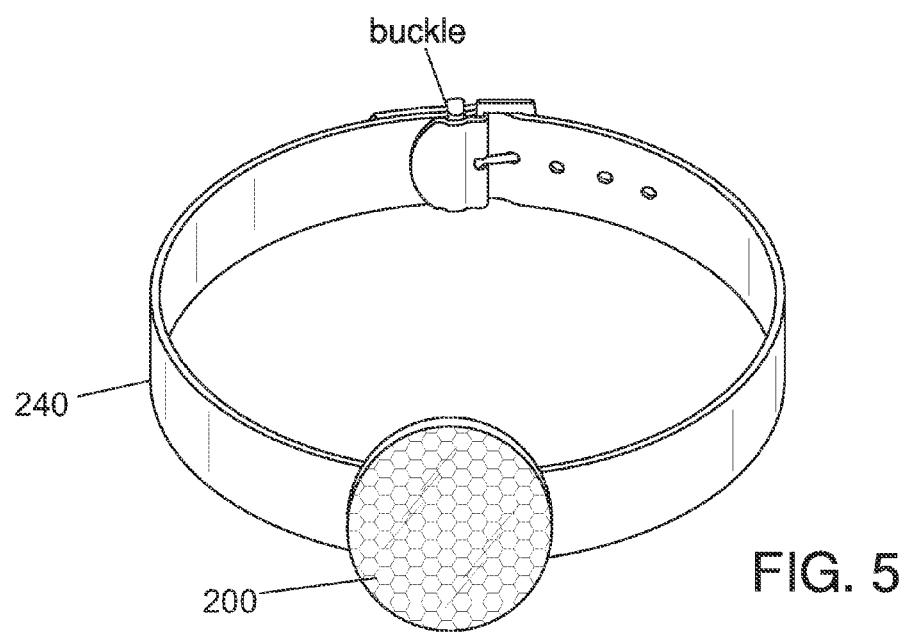
FIG. 5 shows a perspective view of an alternate embodiment of the present invention.
Figure 6:
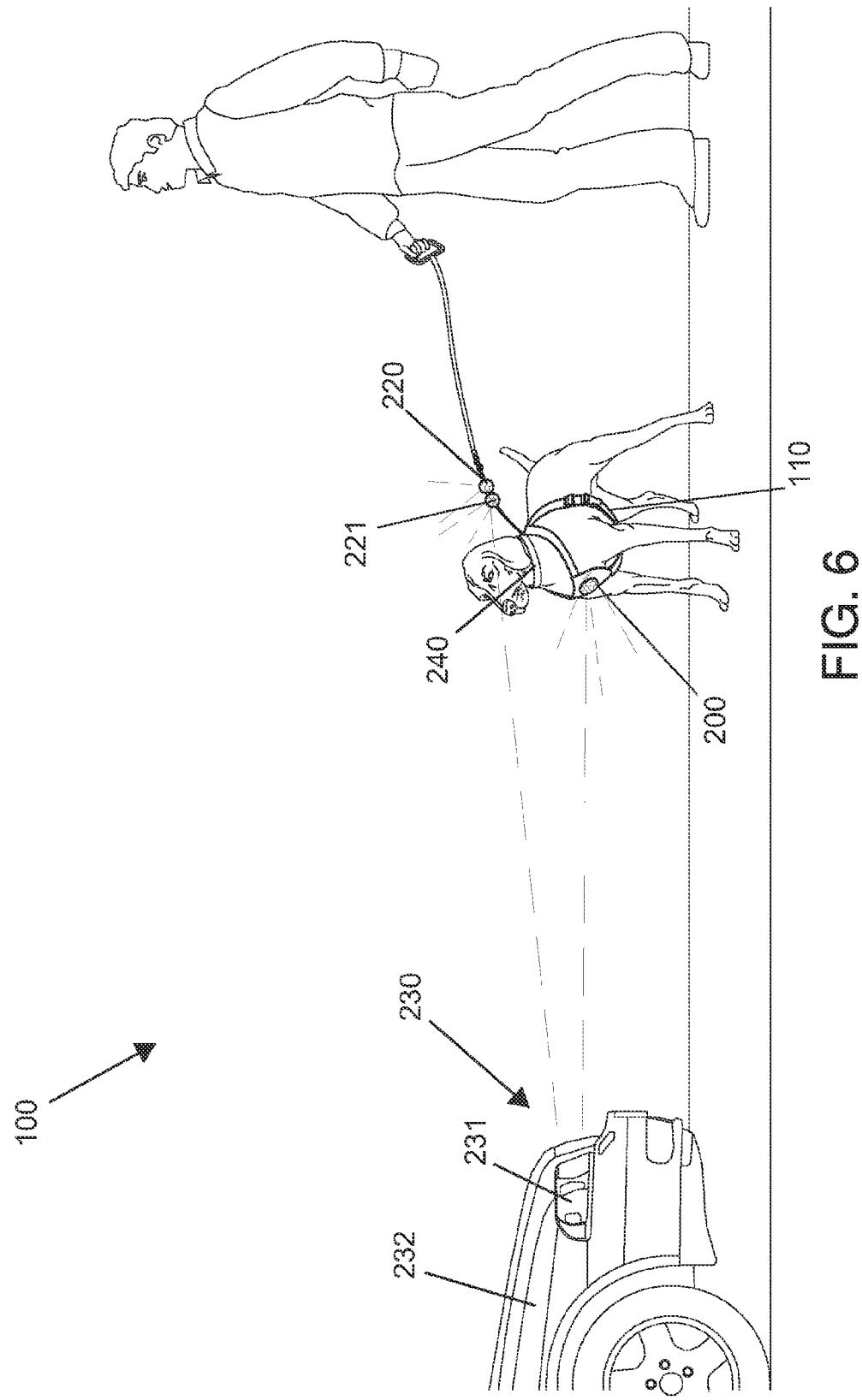
FIG. 6 shows as perspective view of the present invention in use.

Following is a list of elements corresponding to a particular element referred to herein:
100 Mammalian quadruped walking system
110 Body harness
120 First side top shoulder strap
122 First side top shoulder strap second end
130 Second side top shoulder strap
132 Second side top shoulder strap second end
140 Bottom strap
142 Bottom strap second end
150 Upper body strap
151 Upper body strap first end
152 Upper body strap second end
153 Upper body strap midpoint
155 First side latch component
156 Second side latch component
160 Lower body strap
161 Lower body strap first end
162 Lower body strap second end
163 Lower body strap midpoint
165 First side mating latch component
166 Second side mating latch component
170 Breast shield
171 Breast shield first side
172 Breast shield second side
173 Breast shield bottom
180 Neck aperture
200 Planar reflector, (bicycle's strength)
210 Harness extension
211 Harness extension first end
212 Harness extension second end
220 Spherical red bead reflector, (bicycle's strength)
221 Spherical blue bead reflector, (bicycle's strength)
230 External light source
231 Headlamp
232 Automobile
240 Collar Referring now to FIGS. 1-6, the present invention features a mammalian quadruped walking system (100) providing visibility in dimly lit conditions when taking a mammalian quadruped for a walk. In some embodiments, the mammalian quadruped is a dog, a cat, a goat, a pig, a cow, a horse, or any other quadruped that is a mammal.

In some embodiments, the system (100) comprises a body harness (110) for placing on a mammalian quadruped. In some embodiments, the body harness (110) comprises a first side to shoulder strap (120), a second side top shoulder strap (130), a bottom strap (140), an upper body strap (150), a lower body strap (160), and a breast shield (170). In some embodiments, the breast shield (170) comprises a planar reflector (200) located on a front surface thereon. In some embodiments, the planar reflector (200) is only red or blue in color. In some embodiments, the feature of the planar reflector (200) limited to colors of red and blue is critical to the invention. In some embodiments, red and blue are the colors typically used for emergency vehicles and hence, denote caution and danger for the viewer.

In some embodiments, the first side to shoulder strap (120) extends from a breast shield first side (171). In some embodiments, the second side top shoulder strap (130) extends from a breast shield second side (172). In some embodiments, the bottom strap (140) extends from a breast shield bottom (173).

In some embodiments, a first side top shoulder strap second end (122) permanently meets a second side top shoulder strap second end (132) at an upper body strap midpoint (153) forming a neck aperture (180) between the first side top shoulder strap (120), the second side top shoulder strap (130), and the upper body strap (150). In some embodiments, the upper body strap (150) comprises a first side latch component (155) located on an upper body strap first end (151) and a second side latch component (156) located on an upper body strap second end (152).

In some embodiments, a lower body strap midpoint (163) is located on a bottom strap second end (142).

In some embodiments, the lower body strap (160) comprises a first side mating latch component (165) located on a lower body strap first end (161) and a second side mating latch component (166) located on a lower body strap second end (162).

In some embodiments, the first side latch component (155) latchably interfaces with the first side mating latch component (165). In some embodiments, the second side latch component (156) latchably interfaces with the second side mating latch component (166).

In some embodiments, the system (100) comprises a harness extension (210) having a harness extension first end (211) and a harness extension second end (212). In some embodiments, the harness extension first end (211) is located at the intersection of the first side top shoulder strap second end (122), the second side top shoulder strap second end (132), and the upper body strap midpoint (153).

In some embodiments, a spherical red bead reflector (220) is located close to the harness extension second end (212). In some embodiments, a spherical blue bead reflector (221) is located adjacent to the red bead reflector (220) close to the harness extension second end (212). In some embodiments, the feature of the spherical red bead reflector (220) and the spherical blue bead reflector (221) being limited to colors of red and blue, respectively is critical to the invention. In some embodiments, most individuals with colorblindness cannot distinguish between red and green, but can see blue. Having BOTH colored reflectors adjacent to one another is critical to ensure maximum visibility—even to ones who may be colorblind. Blue color is the best for perception.

In some embodiments, the system (100) comprises an external light source (230) emitting light in a horizontal beam. In some embodiments, the external light source (230) is located between 22 inches and 54 inches from a ground surface.

In some embodiments, the body harness (110) is placed upon a mammalian quadruped. In some embodiments, the neck aperture (180) is placed over a head and neck of the quadruped. In some embodiments, the upper body strap (150) is placed behind a pair of shoulders on a back of the quadruped. In some embodiments, the first side latch component (155) located on the upper body strap first end (151) is connected to the first side mating latch component (165) located on the lower body strap first end (161). In some embodiments, the second side latch component (156) located on the upper body strap second end (152) is connected to the second side mating latch component (166) located on the lower body strap second end (162). In some embodiments, the upper body strap (150) connects to the lower body strap (160) to wrap around a torso of the mammalian quadruped. In some embodiments, the harness extension second end (212) is attached to a leash.

In some embodiments, the upper body strap (150) is adjustable in length.

In some embodiments, the powerful bicycle's strength planar reflector (200) is red. In some embodiments, the planar reflector (200) is blue (for example, this part can be purchased at Bicycle Heaven; Pittsburgh, Pa.; Product Number is 350351789928).

In some embodiments, the plane reflector (200) is ¼ inch thick.

In some embodiments, the planar reflector (200) is round. In some embodiments, the planar reflector (200) is 3 inches in diameter. In some embodiments, the planar reflector (200) is 2 inches in diameter.

In some embodiments, the external light source (230) is a headlamp (231) of an automobile (232).

In some embodiments, a collar (240) is located around the neck of the mammalian quadruped. In some embodiments, a second planar reflector (200) is located on the collar (240). In some embodiments, a third planar reflector (200) is located on the collar (240). In some embodiments, a leash can be used with the collar (240) equipped with the powerful bicycle's strength planar reflector(s) (200) to provide an improved degree of safety. In some embodiments, using the body harness (110) provides an increased degree of safety over using the collar (240). In some embodiments, the collar (240) can be worn in conjunction with the body harness (110).

As used herein, the term "about" refers to plus or minus 10% of the referenced number.

The disclosures of the following U.S. Patents are incorporated in their entirety by reference herein: U.S. Pat. No. D 455,873; U.S. Pat. No. D 363,572;

U.S. Pat. No. 7,997,235; U.S. Pat. No. 6,070,556; U.S. Pat. No. 5,970,921; U.S. Pat. No. 5,535,106; U.S. Pat. No. 5,370,082; U.S. Pat. No. 3,999,521; and U.S. Pat. No. 3,871,336.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using he phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A mammalian quadruped walking system providing visibility in dimly lit conditions when taking a mammalian quadruped for a walk, wherein the system (100) comprises:
    (a) a body harness (110) configured to be disposed on a mammalian quadruped, wherein the body harness (110) comprises a first side top shoulder strap (120), a second side top shoulder strap (130), a bottom strap (140), an upper body strap (150), a lower body strap (160), and a breast shield (170), wherein the breast shield (170) comprises a powerful planar reflector (200) disposed on a front surface thereon, wherein the planar reflector (200) is only red or blue in color, wherein the first side top shoulder strap (120) extends from a breast shield first side (171), wherein the second side top shoulder strap (130) extends from a breast shield second side (172), wherein the bottom strap (140) extends from a breast shield bottom (173), wherein a first side top should strap second end (122) permanently meets a second side top shoulder strap second end (132) at an upper body strap midpoint (153) forming a neck aperture (180): wherein the upper body strap (150) comprises a first side latch component (155) disposed on an upper body strap first end (151) and a second side latch component (156) disposed on an upper body strap second end (152), wherein a lower body strap midpoint (163) is disposed on a bottom strap second end (142), wherein the lower body strap comprises a first side mating latch component (165) disposed on a lower body strap first end (161) and a second side mating latch component (166) disposed on a lower body strap second end (162), wherein the first side latch component (155) latchably interfaces with the first side mating latch component (165), wherein the second side latch component (156) latchably interfaces with the second side mating latch component (166), (b) a harness extension (210) having a harness extension first end (211) and a harness extension second end (212), wherein the harness extension first end (211) is disposed at the intersection of the first side top shoulder strap second end (122), the second side top shoulder strap second end (132) and the upper body strap midpoint (153), wherein a spherical red bead reflector (220) is disposed proximal to the harness extension second end (212), wherein a spherical blue bead reflector (221) is disposed adjacent to the red bead reflector (220) proximal to the harness extension second end (212);

wherein, when in use, the body harness (110) is disposed upon a mammalian quadruped, the neck aperture (180) is placed over a head and neck of the quadruped, the upper body strap (150) is placed behind a pair of shoulders on a back of the quadruped, the first side latch component (155) disposed on the upper body strap first end (151) is connected to the first side mating latch component (165) disposed on the lower body strap first end (161), the second side latch component (156) disposed on the upper body strap second end (152) is connected to the second side mating latch component (166) disposed on the lower body strap second end (162), and the harness extension second end (212) is attached to a leash.

2. The system (100) of claim 1, wherein the upper body strap (150) is adjustable in length.

3. The system (100) of claim 1, wherein the powerful planar reflector (200) is red.

4. The system (100) of claim 1, wherein the powerful planar reflector (200) is blue.

5. The system (100) of claim 1, wherein the planar reflector (200) is ¼ inch thick.

6. The system (100) of claim 1, wherein the powerful planar reflector (200) is round, wherein the planar reflector (200) is 3 inches in diameter.

7. The system (100) of claim 1, wherein the powerful planar reflector (200) is round, wherein the planer reflector (200) is 2 inches in diameter.

8. The system (100) of claim 1, further comprising a collar (240) configured to be disposed around the neck of the mammalian quadruped.

9. The system (100) of claim 8, wherein a second powerful planar reflector (200) is disposed on the collar (240).

10. The system (100) of claim 9, wherein a third powerful planar reflector (200) is disposed on the collar (240).

* * * * *